United States Patent
Perry et al.

(10) Patent No.: US 10,215,023 B2
(45) Date of Patent: Feb. 26, 2019

(54) TRAPPING SHOE LUBRICATION SYSTEM

(71) Applicant: Joy MM Delaware, Inc., Wilmington, DE (US)

(72) Inventors: Ryan E. Perry, Venus, PA (US); Troy Amsler, Shippenville, PA (US)

(73) Assignee: Joy Global Underground Mining LLC, Warrendale, PA (US)

( * ) Notice: Subject to any disclaimer, the term of this patent is extended or adjusted under 35 U.S.C. 154(b) by 141 days.

(21) Appl. No.: 15/261,593

(22) Filed: Sep. 9, 2016

(65) Prior Publication Data
US 2017/0074097 A1    Mar. 16, 2017

Related U.S. Application Data

(60) Provisional application No. 62/217,169, filed on Sep. 11, 2015.

(51) Int. Cl.
| | |
|---|---|
| *E21C 29/02* | (2006.01) |
| *E21C 35/12* | (2006.01) |
| *F16H 19/04* | (2006.01) |
| *F16H 57/04* | (2010.01) |
| *E21C 35/00* | (2006.01) |

(52) U.S. Cl.
CPC .............. *E21C 29/02* (2013.01); *E21C 35/00* (2013.01); *E21C 35/12* (2013.01); *F16H 19/04* (2013.01); *F16H 57/0424* (2013.01); *F16H 57/0493* (2013.01)

(58) Field of Classification Search
CPC .......... E21C 27/36; E21C 29/02; E21C 35/12; E21C 35/22; E21C 2035/226
See application file for complete search history.

(56) References Cited

U.S. PATENT DOCUMENTS

| | | | |
|---|---|---|---|
| 3,493,267 A | 2/1970 | Willner | |
| 3,666,320 A | 5/1972 | Lanfermann | |
| 4,067,620 A * | 1/1978 | Lanfermann | E21C 27/02 299/43 |
| 4,189,188 A | 2/1980 | Schupphaus et al. | |
| 4,234,234 A * | 11/1980 | Sedlaczek | E21C 29/02 105/29.1 |
| 4,236,758 A | 12/1980 | Groger | |
| 4,240,667 A * | 12/1980 | Sedlaczek | B62D 55/116 104/279 |
| 4,515,409 A * | 5/1985 | Parrott | E21C 29/02 299/43 |
| 4,570,505 A | 2/1986 | Peterson | |
| 4,584,893 A | 4/1986 | Harding et al. | |

(Continued)

*Primary Examiner* — Janine M Kreck
*Assistant Examiner* — Michael A Goodwin
(74) *Attorney, Agent, or Firm* — Michael Best & Friedrich LLP (57) ABSTRACT

A system for guiding movement of a chassis of a mining machine along a rack includes a shoe and a fluid line for receiving fluid from a fluid source. The shoe is configured to be coupled to the chassis and slidably engage the rack. The shoe is configured to extend at least partially around the rack. The shoe includes a first end, a second end, an inner surface, and an outer surface. At least a portion of the inner surface is configured to be positioned adjacent the rack. The fluid line includes an outlet positioned proximate the shoe for dispensing the fluid at an interface between the shoe and the rack.

21 Claims, 9 Drawing Sheets

(56) References Cited

U.S. PATENT DOCUMENTS

| | | | |
|---|---|---|---|
| 4,648,659 A * | 3/1987 | Masovich | E21C 29/02 299/1.6 |
| 4,943,120 A | 7/1990 | Groger | |
| 8,727,450 B2 | 5/2014 | de Andrade et al. | |
| 2010/0019563 A1 * | 1/2010 | Thomson | E21C 29/02 299/43 |
| 2012/0104832 A1 * | 5/2012 | Niederriter | E21C 29/02 299/43 |

* cited by examiner

TRAPPING SHOE LUBRICATION SYSTEM

CROSS-REFERENCE TO RELATED APPLICATIONS

This application claims priority to prior-filed U.S. Provisional Patent Application No. 62/217,169, filed Sep. 11, 2015, the entire contents of which are hereby incorporated by reference.

BACKGROUND

The present disclosure relates to the field of mining machines, and particularly to a trapping shoe for a longwall shearer mining machine.

Conventional longwall shearers include a frame and a pair of cutting assemblies mounted on each end of the frame. Each cutting assembly includes a cutting drum for engaging a mine wall. As the frame traverses a mine wall, the cutting drums cut material from the mine face. In some embodiments, the material is deposited on a conveyor and carried away from the mine face. The shearer includes a drive mechanism for moving the machine with respect to the mine wall.

SUMMARY

In one aspect, a system for guiding movement of a chassis of a mining machine along a rack includes a shoe and a fluid line for receiving fluid from a fluid source. The shoe is configured to be coupled to the chassis and slidably engage the rack. The shoe is configured to extend at least partially around the rack. The shoe includes a first end, a second end, an inner surface, and an outer surface. At least a portion of the inner surface is configured to be positioned adjacent the rack. The fluid line includes an outlet positioned proximate the shoe for dispensing the fluid at an interface between the shoe and the rack.

In another aspect, a drive system for driving a mining machine along a rack includes a drive mechanism configured to engage the rack to move the mining machine relative to the rack, a shoe positioned adjacent the drive mechanism, and a fluid system for conveying a lubricant. The shoe is configured to slidably engage the rack. The shoe aligns the drive mechanism relative to the rack. The shoe includes a first end and a second end. The fluid system including an outlet positioned adjacent at least one of the rack and the shoe.

In yet another aspect, a mining machine is movable along a rack and includes a chassis, a cutter assembly, a shoe coupled to the chassis, and a fluid line for receiving a fluid from a fluid source. The cutter assembly includes an arm and a cutting drum. The arm includes a first end pivotably coupled to the chassis and a second end supporting the cutting drum for rotation relative to the arm. The shoe is configured to extend at least partially around the rack. The shoe includes a first surface and a second surface, and the first surface is configured to be positioned adjacent the rack. The fluid line includes an outlet positioned proximate the shoe for dispensing fluid to at least one of the rack and the shoe.

Other aspects will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
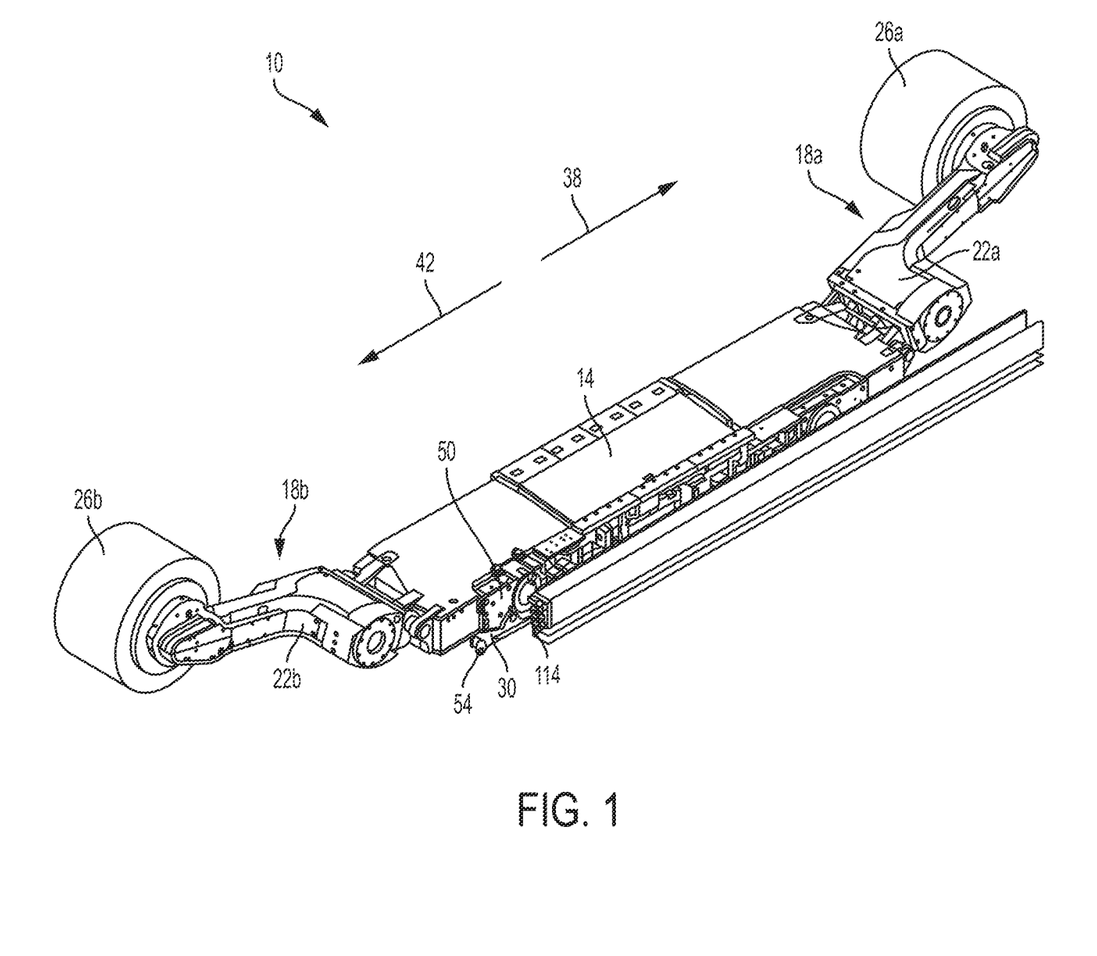
FIG. 1 is a perspective view of a mining machine.

FIG. 1 illustrates a mining machine (e.g., a longwall shearer 10) including a chassis or frame 14 and a pair of cutting assemblies (i.e., a first cutting assembly 18a and a second cutting assembly 18b). Each cutting assembly 18 includes a ranging arm 22 and a cutting drum 26. Each ranging arm 22 is pivotably coupled to the frame 14 and rotatably supports the associated cutting drum 26. Each cutting drum 26 includes a generally cylindrical body. In some embodiments, each cutting drum 26 includes one or more helical vanes (not shown) and a plurality of cutting bits (not shown) positioned along the edges of each vane. For example, each cutting drum may be formed as shown in U.S. Publication No. 2014/0084666, filed Sep. 20, 2013, the entire contents of which are incorporated by reference herein. Each drum 26 is coupled to the respective ranging arm 22 and is rotatable about a respective drum axis. In the illustrated embodiment, each drum axis is generally perpendicular to the mining machine's directions of movement 38, 42.

Figure 2:
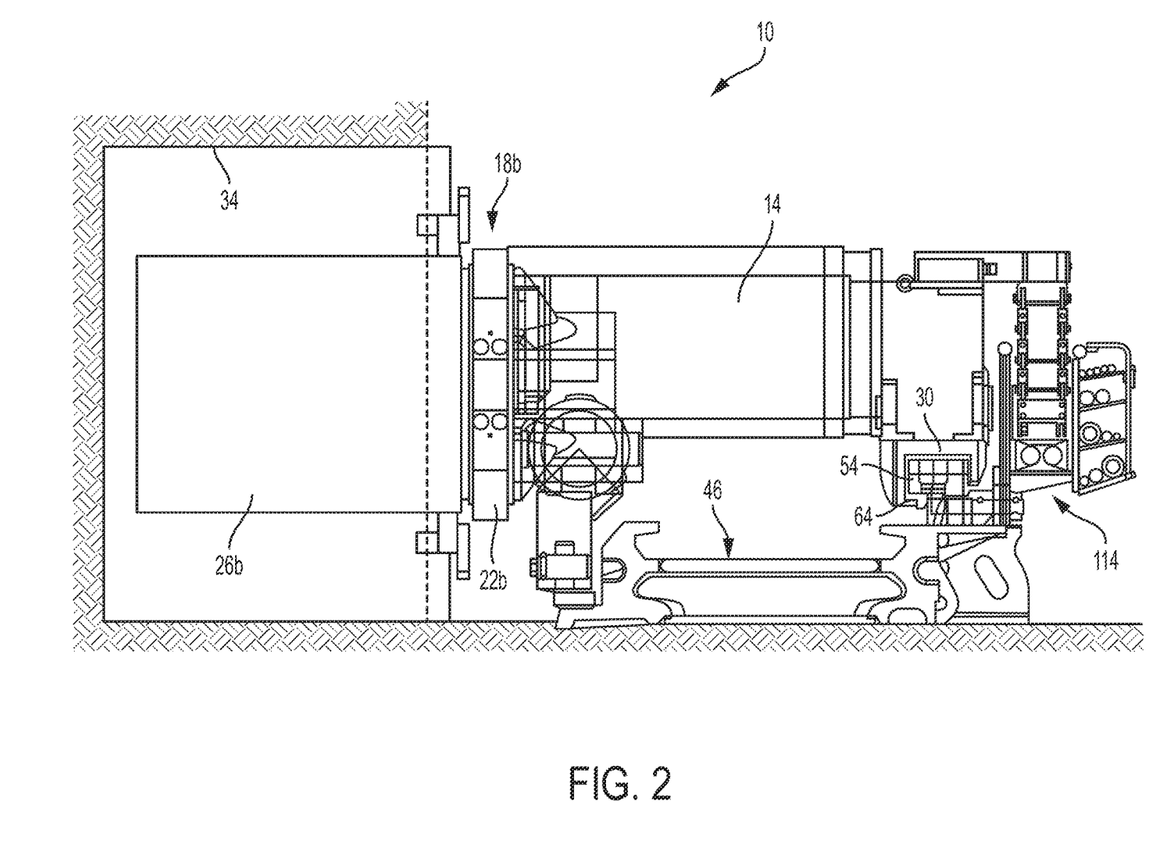
FIG. 2 is end view of the mining machine of FIG. 1 engaging a mine wall.

As shown in FIGS. 1 and 2, the frame 14 is configured to tram or move along a mine face or wall 34 (FIG. 2) of material to be mined. In the illustrated embodiment, the frame 14 moves in a first direction 38 (FIG. 1) and a second direction 42 opposite the first direction 38. The first direction 38 and the second direction 42 are generally parallel to the mine face (FIG. 2).

Referring now to FIG. 2, each drum 26 is configured to engage the mine wall 34 to cut material from the wall 34. As each cutting drum 26 rotates about its axis, the vanes (not shown) carry the cut material from the wall 34 toward a rear end of each drum 26, where the cut material is deposited onto a face conveyor 46. As the frame 14 moves, for example, in the first direction 38, the first cutting assembly 18a is in a first or leading position and the second cutting assembly 18b is in a second or trailing position. In the embodiment shown in FIG. 1, each cutting assembly 18a, 18b is in an elevated position. However, in other embodiments, each cutting assembly 18a, 18b may be positioned independently of the other (e.g., a leading cutting assembly may be positioned in an upper position and a trailing cutting assembly may be positioned in a lower position) to cut the material from the upper portion and a lower portion of the mine wall 34 in the same pass. In the illustrated embodiment, the mining machine 10 further includes a cable handler 114 to manage electrical, communication, and fluid conduits that are in communication with the machine 10.

Figure 3:
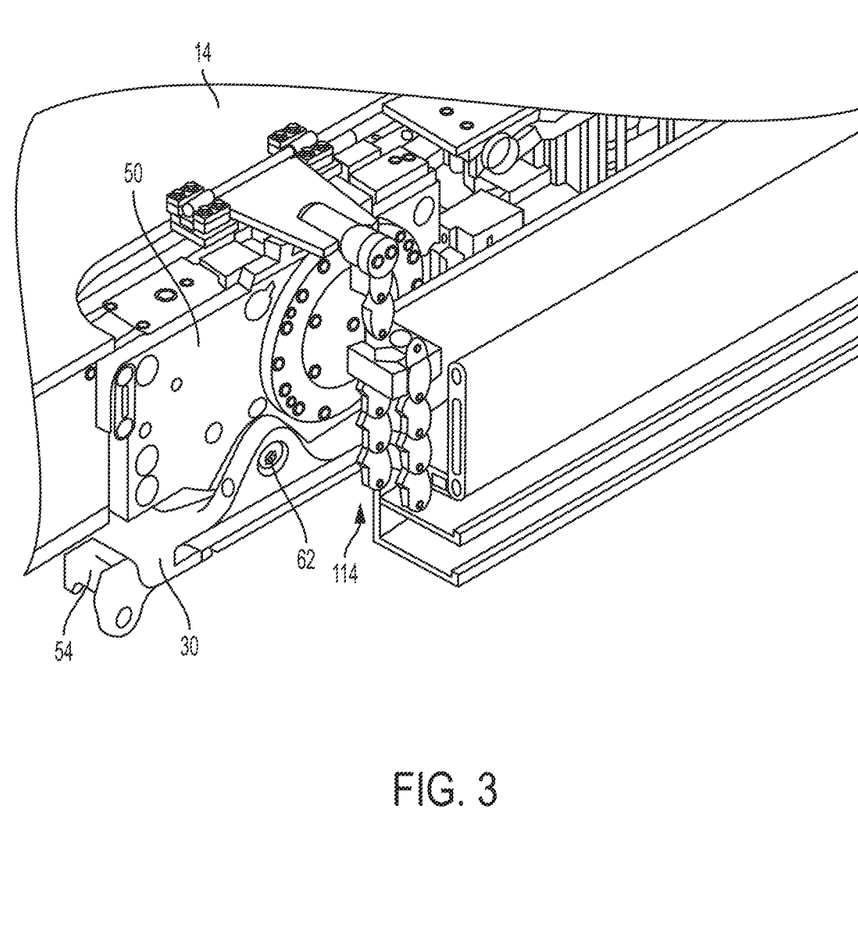
FIG. 3 is an enlarged perspective view of a portion of the mining machine of FIG. 1.
Figure 4:
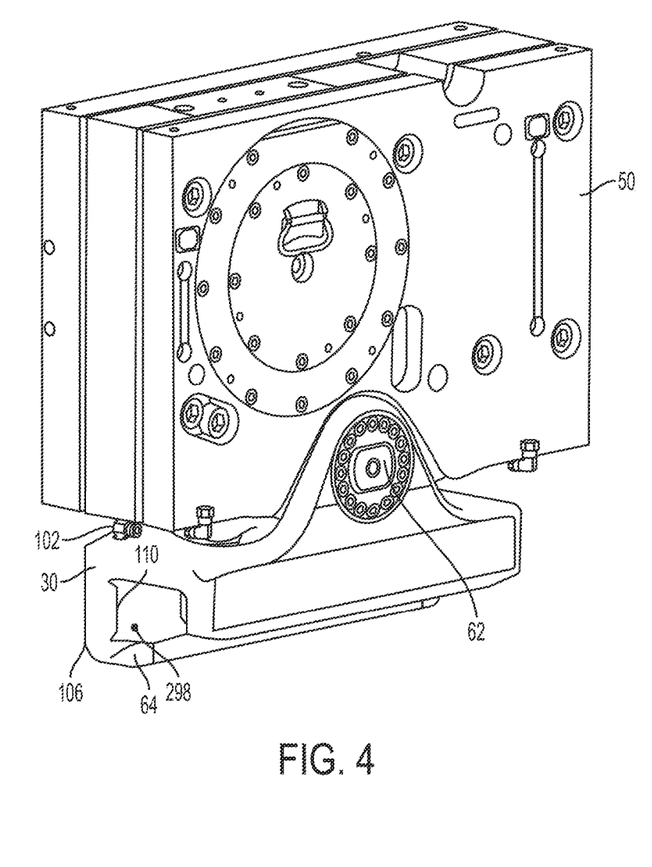
FIG. 4 is a perspective view of a drive mechanism.
Figure 5:
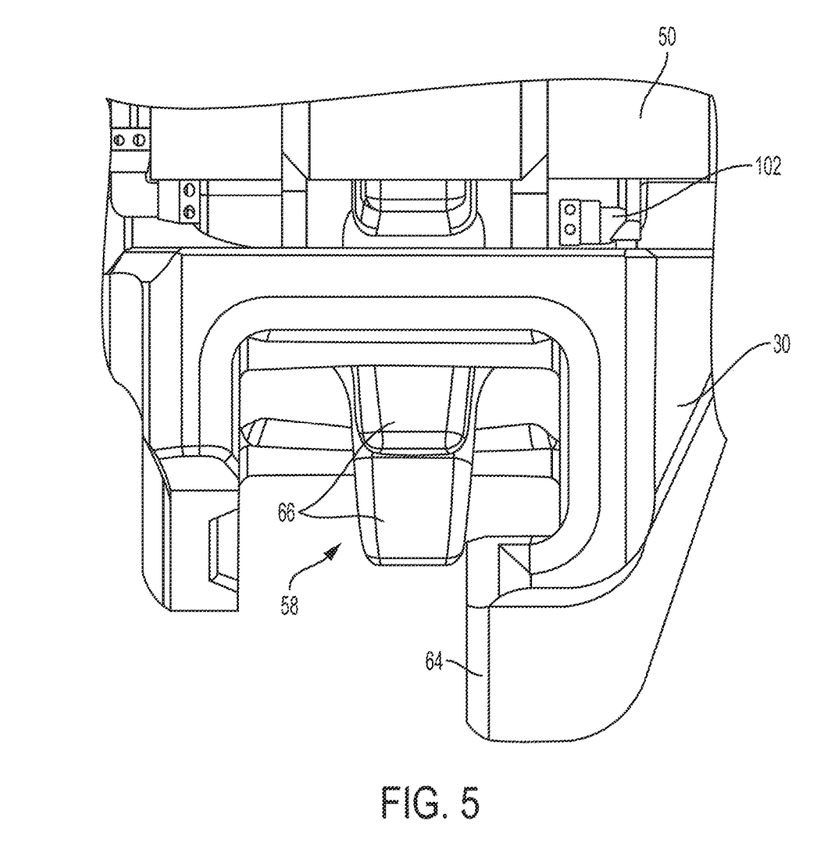
FIG. 5 is an end view of a trapping shoe.

With reference to FIGS. 3-5, the shearer frame 14 includes a downdrive or drive mechanism 50 configured to engage a rack 54 (FIG. 3) and drive the frame 14. More specifically, the drive mechanism 50 includes a sprocket 58 (FIG. 5) rotationally coupled to a shaft (not shown) and driven by a motor (not shown) to engage the rack 54. The sprocket 58 and rack 54 form a rack-and-pinion connection such that rotation of the sprocket 58 drives the frame 14 to move along the rack 54. The trapping shoe 30 is pivotably coupled to the housing of the downdrive 50 (e.g., by a pin 62). The shoe 30 may also include a hook portion 64 extending around a portion of the rack 54 and engaging an underside or bottom surface of the rack 54 (see e.g., FIG. 9). The hook portion 64 maintains engagement between the shoe 30 and the rack 54 and guides the shoe 30 as it slides relative to the rack 54. In one embodiment, an upper surface of the shoe 30 includes an opening and a portion of the sprocket 58 extends through the opening. The sprocket 58 includes teeth 66 extending around the perimeter of the sprocket 58, which engage the rack 54 (FIG. 3). The shoe 30 guides the movement of the frame 14 relative to the rack 54 and insures that the sprocket 58 remains aligned and engaged with the rack 54. Although only one shoe 30 is shown in the illustrated embodiment, it is understood that one or more additional shoes 30 can be coupled to another portion of the frame 14.

Figure 6:
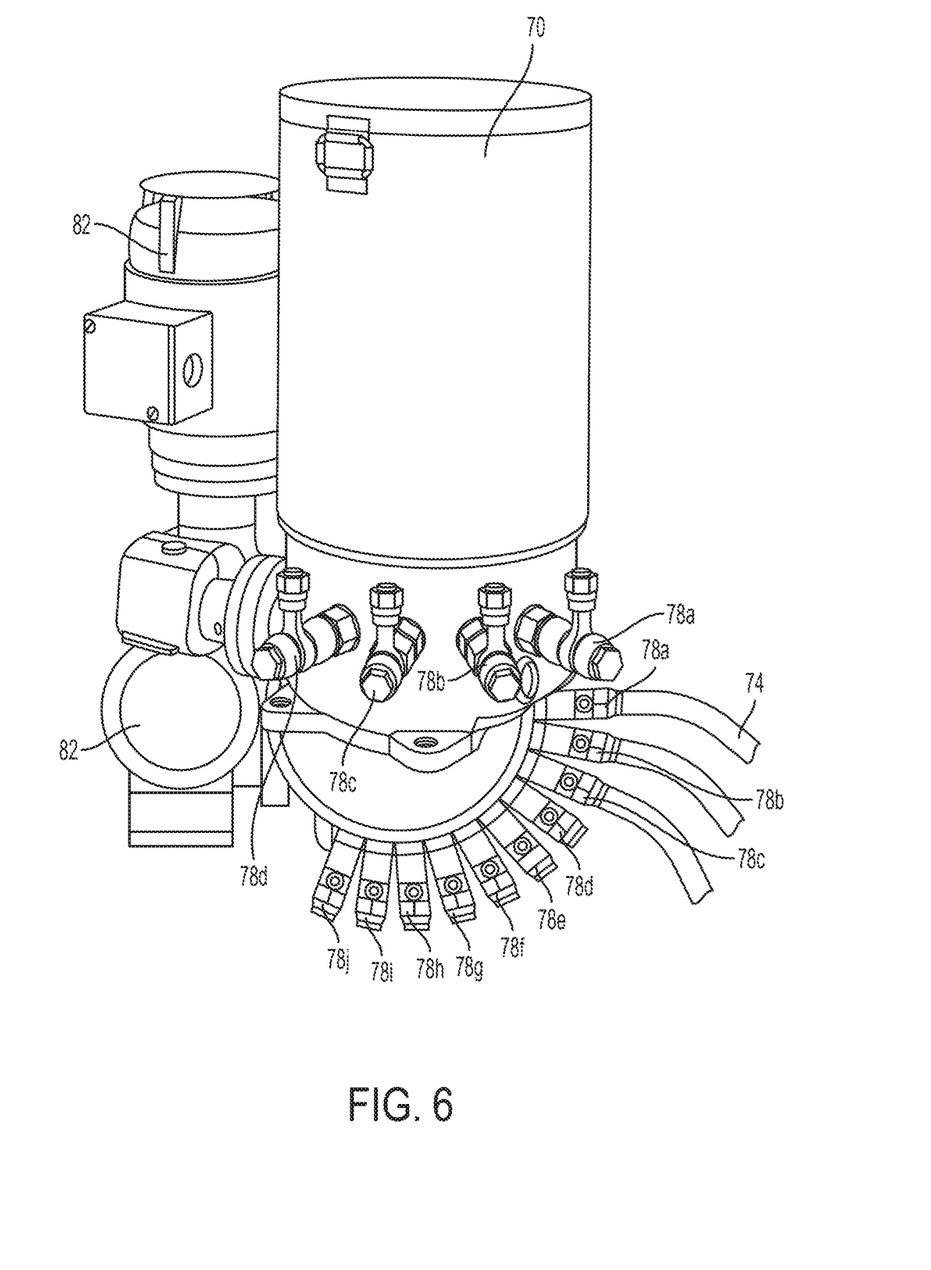
FIG. 6 is a perspective view of a fluid reservoir.
Figure 7:
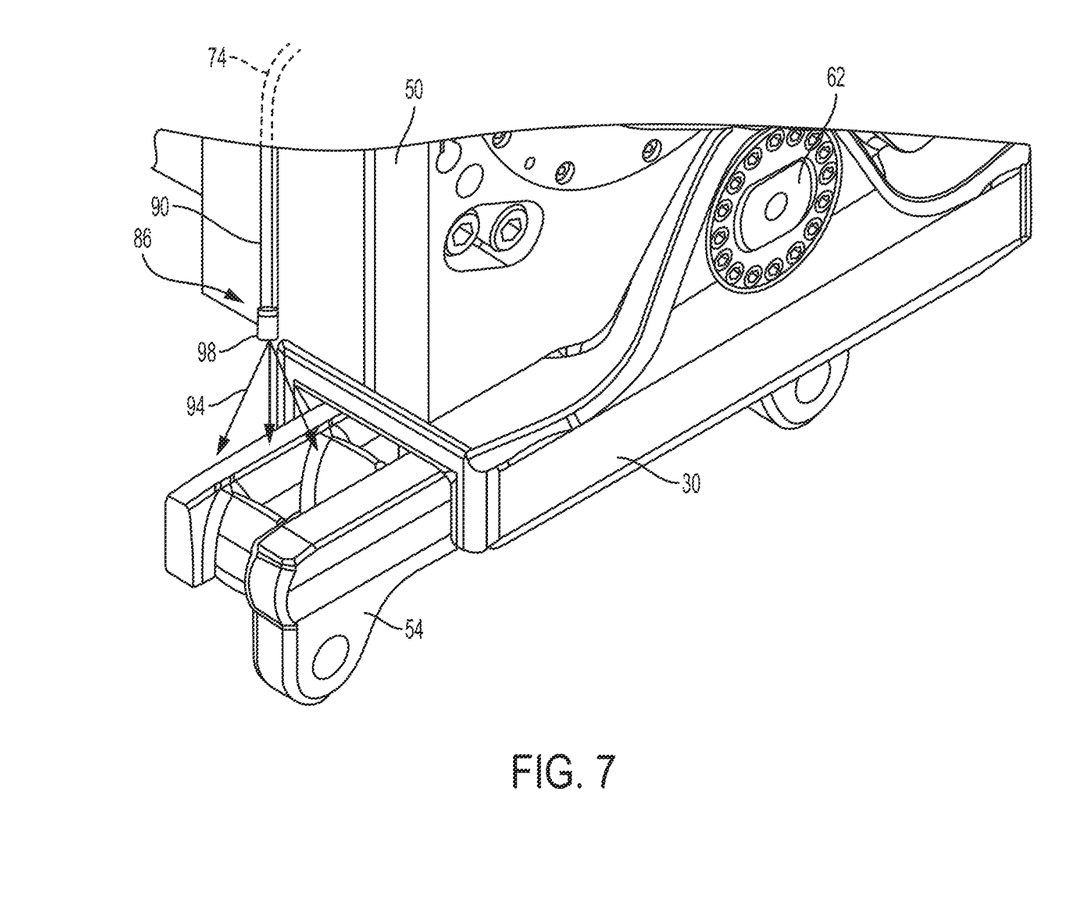
FIG. 7 is a perspective view of a drive mechanism and a lubrication system.

Referring now to FIGS. 6 and 7, the mining machine 10 also includes a lubrication system to provide a lubricant directly to the rack 54. In one embodiment, the lubrication system includes a hydraulic fluid reservoir 70 (FIG. 6) at least one fluid line 74 in communication with the reservoir 70 via outlets 78a-d, and a hydraulic pump 82 for displacing fluid through the fluid line 74. It is understood that there may be fewer or more outlets (e.g., 78e-j) than shown in FIG. 6. In some embodiments, the lubricant source (i.e., the reservoir 70) is supported separate from the frame 14 and remotely pumps fluid to the mining machine 10 via the fluid line 74. The fluid line 74 may be supported by the cable handler 114 (FIG. 2) as the mining machine 10 moves along the mine wall.

In the embodiment as illustrated in FIG. 7, a distal end 86 of the fluid line 74 terminates at the downdrive 50, and is spaced apart from the trapping shoe 30. A passage 90 in communication with the fluid line 74 may be positioned on an exterior surface of the downdrive 50. Fluid from the passage 90 may be sprayed or dripped onto the rack 54. In one embodiment, the fluid flows onto the rack 54 in direction 94. In this particular embodiment, the fluid is pumped from one of the outlets 78a-j, through the fluid line 74 and the passage 90, and expelled out of a port 98 at the distal end 86. Although the passage 90 is illustrated in FIG. 7 on the exterior of the downdrive 50, it is understood that the passage 90 could also be disposed on the interior of the downdrive 50.

Figure 8:
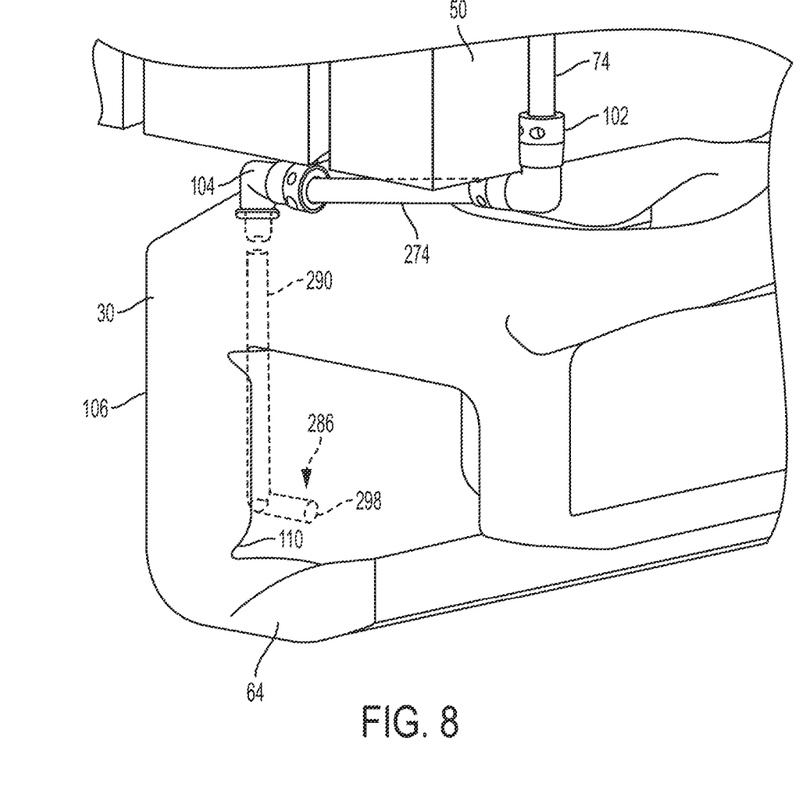
FIG. 8 is a perspective view of a trapping shoe and a lubrication system according to another embodiment.

FIG. 8 illustrates another embodiment in which the fluid line 74 extends through an internal passage 290 formed in the body of the shoe 30. In one embodiment, the fluid line 74 is coupled to a first elbow fitting 102 coupled to the downdrive 50, and a second fluid line 274 is in fluid communication with a second elbow fitting 104 coupled to the trapping shoe 30. An internal passage 290 extends through the body of the shoe 30 between an outer surface 106 and an inner surface 110 of the shoe 30. A distal end 286 of the internal passage 290 terminates at the inner surface 110, forming an opening or port 298. Thus, fluid is conveyed through each fluid line 74, 274, the respective elbow fittings 102, 104, the passage 290, and is expelled at a port 298 positioned on the inner surface 110 of the shoe 30. As such, the fluid is applied directly to the rack 54.

In the illustrated embodiment, the port 298 is located on a vertical wall of the inner surface 110, between an upper portion and the hook portion 64. In other embodiments, the fluid lines and passages may be formed in a different manner. Although only one fluid line 274 is shown, more than one fluid line 274 may be provided in the trapping shoe 30, and multiple fluid lines may convey fluid to multiple ports positioned at various locations on the inner surface 110 of the shoe 30. In some embodiments, each fluid line 274 may be in fluid communication with each outlet 78a-d(e-j). Also, in the illustrated embodiment, the fluid line 274 is provided with sufficient length to permit movement of the trapping shoe 30 relative to the downdrive 50 while minimizing stress on the fluid lines 74, 274 and the fittings 102, 104.

For each of the previously described embodiments, the reservoir 70 can either be positioned on-board or off-board the frame 14. In the case where the reservoir 70 is separate from the machine (i.e., off-board), the fluid line 74, 274 may be supported by the cable handler 114 (FIG. 2) of the frame 14, such that the fluid line 74, 274 is able to extend from at least one of the outlets 78a-d(e-j) to the downdrive 50 and/or the trapping shoe 30 without becoming entangled with the shearer 10. Positioning the reservoir 70 away from the machine 10 may be advantageous for maintaining a low profile of the machine 10, especially for low mine seam applications.

Figure 9:
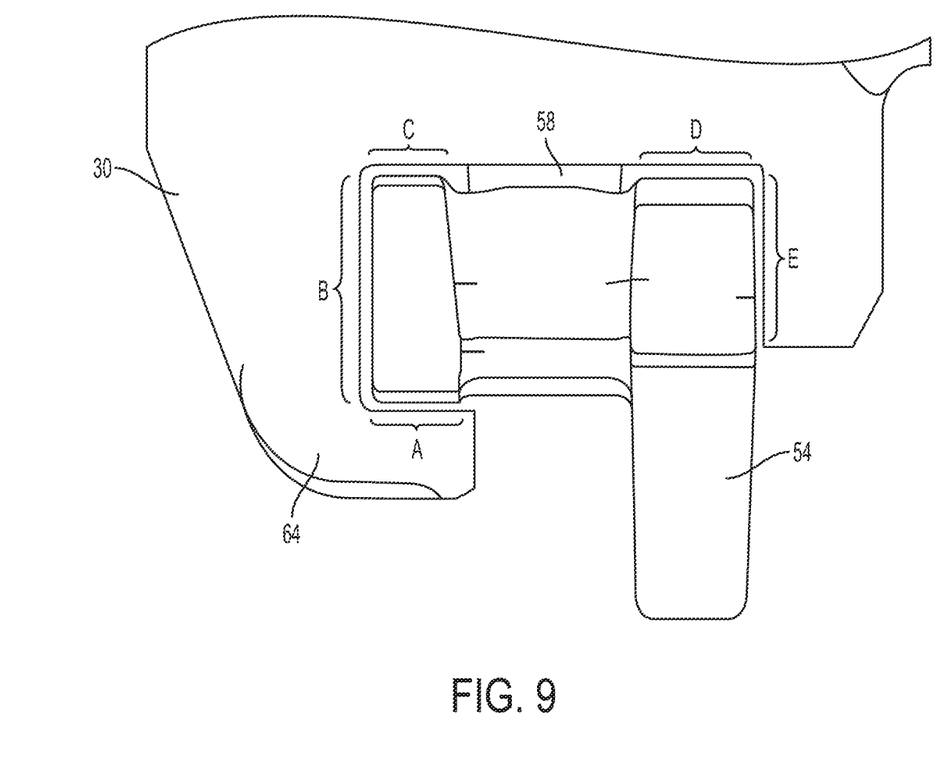
FIG. 9 is an end view of the trapping shoe of FIG. 5 engaged with a rack.

With reference to FIG. 9, during operation the shoe 30 is exposed to large loads (e.g., due to the weight of the shearer 10). The large loads increase friction between the shoe 30 and the rack 54. As a result, the shoe 30 may experience wear in multiple zones (e.g., zones A, B, C, D, and E). Furthermore, debris (e.g., lumps of rock or the like) cut from the mine wall 34 clogs the space between the shoe 30 and the rack 54, which compounds the amount of wear on the shoe 30. Wear on the shoe 30 may result in poor engagement between the sprocket 58 and the rack 54. By supplying lubricant via the lubrication system, friction is decreased between the rack 54 and the shoe 30, thereby decreasing wear and prolonging the working life of the rack 54 and the shoe 30. As a result, the rack 54 and sprocket 58 may maintain sufficient engagement for a longer period of time. In some embodiments, the lubrication system may provide lubricant directly to each one of zones A, B, C, D, and E, or some subset thereof.

Although some aspects have been described in detail with reference to certain preferred embodiments, variations and modifications exist within the scope and spirit of one or more independent aspects as described.

What is claimed is:

1. A system for guiding movement of a chassis of a mining machine along a rack, the system comprising:

a shoe configured to be coupled to the chassis and slidably engage the rack, the shoe configured to extend at least partially around the rack, the shoe including a first end, a second end, an inner surface, and an outer surface, at least a portion of the inner surface configured to be positioned adjacent the rack; and a fluid line for receiving a fluid from a fluid source, the fluid line including an outlet positioned proximate the shoe for dispensing the fluid at an interface between the shoe and the rack to increase lubrication between the shoe and the rack.

2. The system of claim 1, further comprising a drive mechanism, the shoe pivotably coupled to the drive mechanism, the drive mechanism supporting at least a portion of the fluid line.

3. The system of claim 2, wherein the fluid line is disposed on an exterior surface of the drive mechanism.

4. The system of claim 1, wherein the fluid line passes between the outer surface and the inner surface and is in communication with a port formed on the inner surface.

5. The system of claim 1, wherein the fluid line passes through at least a portion of the shoe and is in communication with a port positioned adjacent the interface between the rack and the shoe.

6. The system of claim 1, wherein the outlet is positioned adjacent one of the first end and the second end of the shoe.

7. A drive system for driving a mining machine along a rack, the drive system comprising:

a drive mechanism configured to engage the rack to move the mining machine relative to the rack;

a shoe positioned adjacent the drive mechanism and configured to slidably engage the rack, the shoe aligning the drive mechanism relative to the rack, the shoe including a first end and a second end; and a fluid system for conveying a lubricant to increase lubrication between the shoe and the rack, the fluid system including an outlet positioned adjacent at least one of the rack and the shoe.

8. The drive system of claim 7, wherein the drive mechanism includes a rotatable sprocket to engage the rack to form a rack and pinion connection.

9. The drive system of claim 8, wherein the shoe includes an opening, wherein the sprocket at least partially extends through the opening of the shoe.

10. The drive system of claim 7, wherein the fluid system includes a fluid line passing at least partially through the shoe.

11. The drive system of claim 7, wherein the lubricant is dispensed from the outlet to an interface between the rack and the shoe.

12. The drive system of claim 7, wherein the shoe further includes a hook portion configured to extend around a portion of the rack such that the hook portion abuts an underside of the rack.

13. A mining machine movable along a rack, the mining machine comprising:

a chassis;

a cutter assembly including an arm and a cutting drum, the arm including a first end pivotably coupled to the chassis and a second end supporting the cutting drum for rotation relative to the arm;

a shoe coupled to the chassis, the shoe configured to extend at least partially around the rack, the shoe including a first surface and a second surface, the first surface configured to be positioned adjacent the rack;

a fluid line for receiving a fluid from a fluid source, the fluid line including an outlet positioned proximate the shoe for dispensing the fluid to at least one of the rack and the shoe to increase lubrication between the shoe and the rack.

14. The mining machine of claim 13, further comprising a drive mechanism supported on the chassis and configured to engage the rack, the drive mechanism supporting at least a portion of the fluid line.

15. The mining machine of claim 14, wherein at least a portion of the fluid line is disposed on an exterior of the drive mechanism.

16. The mining machine of claim 14, wherein the drive mechanism includes a rotatable sprocket for engaging the rack to form a rack and pinion connection, such that rotation of the sprocket moves the chassis relative to the rack.

17. The mining machine of claim 13, wherein the fluid line passes between the second surface and the first surface of the shoe and the outlet is formed as a port positioned on the first surface.

18. The mining machine of claim 13, wherein the fluid that is discharged from the outlet is applied directly to the rack proximate one of a first end and a second end of the shoe.

19. The mining machine of claim 13, wherein at least a portion of the fluid line passes through the shoe.

20. The mining machine of claim 13, wherein the outlet of the fluid line is spaced apart from the rack such that the fluid is airborne after being discharged from the outlet and prior to contacting the rack.

21. The mining machine of claim 13, wherein the fluid source is supported remotely from the mining machine, and further comprising a cable handler supporting at least a portion of the fluid line in fluid communication with the fluid source.

* * * * *